United States Patent
Tsuji et al.

(10) Patent No.: US 11,692,047 B2
(45) Date of Patent: Jul. 4, 2023

(54) MANUFACTURING METHOD FOR LOW MOLECULAR WEIGHT POLYTETRAFLUOROETHYLENE

(71) Applicant: DAIKIN INDUSTRIES, LTD., Osaka (JP)

(72) Inventors: Masayuki Tsuji, Osaka (JP); Yuuji Tanaka, Osaka (JP); Hirokazu Yukawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 170 days.

(21) Appl. No.: 16/966,680

(22) PCT Filed: Feb. 5, 2019

(86) PCT No.: PCT/JP2019/003937
§ 371 (c)(1),
(2) Date: Jul. 31, 2020

(87) PCT Pub. No.: WO2019/156039
PCT Pub. Date: Aug. 15, 2019

(65) Prior Publication Data
US 2021/0032379 A1  Feb. 4, 2021

(30) Foreign Application Priority Data

Feb. 7, 2018  (JP) ................. 2018-020458

(51) Int. Cl.
| | |
|---|---|
| *C08F 2/46* | (2006.01) |
| *C08F 2/50* | (2006.01) |
| *C08G 61/04* | (2006.01) |
| *C08F 8/50* | (2006.01) |
| *C08F 114/26* | (2006.01) |

(52) U.S. Cl.
CPC ............. *C08F 8/50* (2013.01); *C08F 114/26* (2013.01)

(58) Field of Classification Search
CPC .. C08F 8/50; C08F 114/26; C08F 2/46; C08F 2/50; C08G 61/04; C08J 3/28; C08J 2427/18; C08J 2327/18

USPC ......... 522/156, 155, 150, 1, 6, 71, 189, 184; 520/1

See application file for complete search history.

(56) References Cited

U.S. PATENT DOCUMENTS 3,838,030 A  9/1974  Kagiya et al.

FOREIGN PATENT DOCUMENTS

| EP | 3 388 472 A1 | 10/2018 | |
|---|---|---|---|
| EP | 3388472 A1 * | 10/2018 | ................ C08F 8/50 |
| JP | S48-78252 A | 10/1973 | |
| JP | 10-147617 A | 6/1998 | |
| JP | 1998147617 * | 6/1998 | |
| JP | 2000-290409 A | 10/2000 | |
| JP | 2003-253007 A | 9/2003 | |

OTHER PUBLICATIONS

Hosokawa etal, JP 1998-147617 Machine Translation, Jun. 2, 1998 (Year: 1998).*
International Preliminary Report on Patentability with translation of Written Opinion dated Aug. 11, 2020, in International Application No. PCT/JP2019/003937.
International Search Report of PCT/JP2019/003937 dated May 7, 2019 [PCT/ISA/210].
Extended European Search Report dated Aug. 5, 2021 in counterpart Application No. 19752024.0.
Lunkwitz et al.; "Modification of perfluorinated polymers by high-energy irradiation"; Journal of Fluorine Chemistry; Elsevier, NL; vol. 125, No. 6; Jun. 1, 2004; pp. 863-873.
Ze Zhang et al.; "Complete mineralization of perfluorooctanoic acid (PFOA) by γ-irradiation in aqueous solution"; Scientific Reports; vol. 4, No. 1, Dec. 10, 2014; pp. 1-6.

* cited by examiner

*Primary Examiner* — Jessica Whiteley
(74) *Attorney, Agent, or Firm* — Sughrue Mion, PLLC

(57) ABSTRACT

A method for producing low molecular weight polytetrafluoroethylene which includes: (1) feeding into an airtight container in the absence of oxygen: high molecular weight polytetrafluoroethylene: and a halogenated polymer having a halogen atom other than a fluorine atom; and (2) irradiating the high molecular weight polytetrafluoroethylene to provide low molecular weight polytetrafluoroethylene having a melt viscosity at 380° C. of $1.0 \times 10^2$ to $7.0 \times 10^5$ Pa·s.

5 Claims, No Drawings

MANUFACTURING METHOD FOR LOW MOLECULAR WEIGHT POLYTETRAFLUOROETHYLENE

CROSS REFERENCE TO RELATED APPLICATIONS

This application is a National Stage of International Application No. PCT/JP2019/003937, filed Feb. 5, 2019, claiming priority to Japanese Patent Application No. 2018-020458, filed Feb. 7, 2018.

TECHNICAL FIELD

The disclosure relates to methods for producing low molecular weight polytetrafluoroethylene.

BACKGROUND ART

Low molecular weight polytetrafluoroethylene (also referred to as "polytetrafluoroethylene wax" or "polytetrafluoroethylene micro powder") having a molecular weight of several thousands to several hundreds of thousands has excellent chemical stability and a very low surface energy, as well as low fibrillatability. Thus, low molecular weight polytetrafluoroethylene is used as an additive for improving the smoothness and the texture of film surfaces in production of articles such as plastics, inks, cosmetics, coatings, and greases (for example, see Patent Literature 1).

Examples of known methods for producing low molecular weight polytetrafluoroethylene include polymerization, radiolysis, and pyrolysis. In the radiolysis, conventionally, it has been common that high molecular weight polytetrafluoroethylene is irradiated in the air atmosphere to provide low molecular weight polytetrafluoroethylene.

CITATION LIST

Patent Literature

Patent Literature 1: JP H10-147617 A

SUMMARY OF INVENTION

Technical Problem

The disclosure aims to provide a method for producing low molecular weight polytetrafluoroethylene less likely to generate C6-C14 perfluorocarboxylic acids and salts thereof.

Solution to Problem

The disclosure relates to a method for producing low molecular weight polytetrafluoroethylene, including:
(1) feeding into an airtight container in the absence of oxygen:
  high molecular weight polytetrafluoroethylene: and
  a halogenated polymer having a halogen atom other than a fluorine atom; and
(2) irradiating the high molecular weight polytetrafluoroethylene to provide low molecular weight polytetrafluoroethylene having a melt viscosity at 380° C. of $1.0 \times 10^2$ to $7.0 \times 10^5$ Pa·s.

The halogenated polymer is preferably a polymer having a chlorine atom.

In the step (2), the airtight container preferably contains substantially no oxygen.

The high molecular weight polytetrafluoroethylene preferably has a standard specific gravity of 2.130 to 2.230.

Both the high molecular weight polytetrafluoroethylene and the low molecular weight polytetrafluoroethylene are preferably in the form of powder.

The production method preferably further includes (3) heating the polytetrafluoroethylene up to a temperature that is not lower than the primary melting point thereof to provide a molded article before the step (1), the molded article having a specific gravity of 1.0 g/cm$^3$ or higher.

Advantageous Effects of Invention

The disclosure can provide a method for producing low molecular weight polytetrafluoroethylene less likely to generate C6-C14 perfluorocarboxylic acids and salts thereof.

DESCRIPTION OF EMBODIMENTS

The disclosure will be specifically described hereinbelow.

The disclosure relates to a method for producing low molecular weight polytetrafluoroethylene, including: (1) feeding into an airtight container in the absence of oxygen: high molecular weight polytetrafluoroethylene: and a halogenated polymer having a halogen atom other than a fluorine atom; and (2) irradiating the high molecular weight polytetrafluoroethylene to provide low molecular weight polytetrafluoroethylene having a melt viscosity at 380° C. of $1.0 \times 10^2$ to $7.0 \times 10^5$ Pa·s.

Irradiation of high molecular weight PTFE under conventional irradiation conditions provides not only low molecular weight PTFE having a higher melt viscosity than high molecular weight PTFE but also C6-C14 perfluorocarboxylic acids or salts thereof. These compounds contains non-naturally occurring, difficult-to-decompose substances which are further indicated to have high bioaccumulation, i.e., perfluorooctanoic acid containing 8 carbon atoms and salts thereof, perfluorononanoic acid containing 9 carbon atoms and salts thereof, and perfluorodecanoic acid, perfluoroundecanoic acid, perfluorododecanoic acid, perfluorotridecanoic acid, and perfluorotetradecanoic acid respectively containing 10, 11, 12, 13, and 14 carbon atoms and salts thereof.

Irradiation of high molecular weight PTFE under conventional irradiation conditions unfortunately generates 25 ppb or more of perfluorooctanoic acid containing 8 carbon atoms or salts thereof.

In the production method of the disclosure, irradiation of the high molecular weight PTFE in the absence of oxygen is less likely to generate C6-C14 perfluorocarboxylic acids and salts thereof. Normally, irradiation in the absence of oxygen has difficulty in providing low molecular weight PTFE. In contrast, the production method of the disclosure includes irradiation in the presence of the halogenated polymer, which enables production of low molecular weight PTFE even in the absence of oxygen. Moreover, easy handleability of the halogenated polymer enables safe and simple production of low molecular weight PTFE.

In the production method of the disclosure, C6-C14 perfluorosulfonic acids and salts thereof are less likely to be generated.

The halogenated polymer has a halogen atom other than a fluorine atom. Preferred as the halogen atom is a chlorine atom, a bromine atom, or an iodine atom, with a chlorine atom being more preferred.

The halogenated polymer may have a fluorine atom in addition to the halogen atom other than a fluorine atom.

The halogenated polymer is preferably a polymer having a chlorine atom because C6-C14 perfluorocarboxylic acids and salts thereof are further less likely to be generated and production of low molecular weight PTFE is further facilitated. Examples of the polymer having a chlorine atom include polyvinyl chloride (PVC), polyvinylidene chloride (PVdC), and polychlorotrifluoroethylene (PCTFE). Preferred among these are PVC and PCTFE, with PCTFE being more preferred.

Examples of the PCTFE include chlorotrifluoroethylene (CTFE) homopolymers, and copolymers containing a chlorotrifluoroethylene unit ("CTFE unit") and a monomer (β) unit copolymerizable with CTFE.

The PCTFE has a melting point of preferably 150° C. to 230° C., more preferably 180° C. to 217° C. The melting point is a temperature corresponding to the maximum value in the melting heat curve obtained by increasing a temperature at a rate of 10° C./min using a differential scanning calorimeter (DSC).

The PCTFE has a flow value of preferably $1 \times 10^{-4}$ to $5 \times 10^{-1}$ (cc/sec). The flow value is determined as follows. A resin is melted at 230° C. in a Koka type flow tester CFT-500D (Shimadzu Corp.) and then extruded from a nozzle (1 mmφ) under a load of 100 kg. The volume of the resin extruded per second corresponds to the flow value.

The PCTFE has a CTFE unit in an amount of preferably 90 to 100 mol %, more preferably 98 to 100 mol %, still more preferably 99 to 100 mol %.

The monomer (β) is not limited as long as it is a monomer copolymerizable with CTFE. Examples thereof include tetrafluoroethylene, ethylene, vinylidene fluoride, perfluoroalkyl vinyl ether, and hexafluoroethylene.

The amount of each monomer in the PCTFE can be calculated by appropriately combining NMR and elemental analysis in accordance with the type of the monomer.

The amount of the halogenated polymer to be fed is preferably 0.001 to 15% by mass, more preferably 0.01% by mass or more, still more preferably 0.1% by mass or more, further preferably 1% by mass or more, particularly preferably 3% by mass or more, while more preferably 12% by mass or less, still more preferably 10% by mass or less, particularly preferably 6% by mass or less, relative to the high molecular weight PTFE.

In the step (1), the high molecular weight PTFE and the halogenated polymer are fed into an airtight container in the absence of oxygen. Here, the phrase "fed into an airtight container in the absence of oxygen" means that the oxygen concentration of the atmosphere inside the airtight container after feeding is 0.1 vol % or less.

The oxygen concentration can be determined by analyzing a gaseous layer inside the airtight container by gas chromatography or observing the color tone of an oxygen detection agent placed in the airtight container.

The method of feeding the high molecular weight PTFE and the halogenated polymer into an airtight container in the absence of oxygen may be, for example, a method of feeding the high molecular weight PTFE and the halogenated polymer together with at least one selected from the group consisting of inert gases and oxygen adsorbents, into an airtight container. Preferred is feeding of the high molecular weight PTFE and the halogenated polymer together with an inert gas into an airtight container.

The above substances may be fed into the airtight container by, for example, a method in which the high molecular weight PTFE and the halogenated polymer are placed in the airtight container, and then the airtight container is filled with the inert gas. In the case of using the oxygen adsorbent, examples of the feeding method include a method in which the high molecular weight PTFE, the halogenated polymer, and the oxygen adsorbent are placed in the airtight container in the air atmosphere, and then the airtight container is sealed up; a method in which the high molecular weight PTFE, the halogenated polymer, and the oxygen adsorbent are placed in the airtight container, and then the airtight container is filled with the inert gas; and a method in which the high molecular weight PTFE, the halogenated polymer, and the oxygen adsorbent are placed in the airtight container, and then the airtight container is evacuated.

In the airtight container, the halogenated polymer may be placed in a state that it is in direct contact with the high molecular weight PTFE by mixing or the like or in a state that it is not in direct contact with the high molecular weight PTFE but can contribute to the decomposition of the high molecular weight PTFE by irradiation. Examples of the method of placing the halogenated polymer in the latter state include a method in which one of the high molecular weight PTFE and the halogenated polymer is put in a unsealed (breathable) container, and the container is placed in the airtight container, followed by placement of the other inside the airtight container but outside the unsealed container.

The inert gas needs to be a gas inert to a reaction of generating low molecular weight PTFE by irradiation. Examples of the inert gas include gases containing nitrogen, helium, argon, or the like. Preferred is a gas containing nitrogen.

The inert gas preferably has an oxygen content of 0.1 vol % or less. The lower limit thereof may be any value, and may be lower than the detection limit. With the inert gas having an oxygen content within the above range, irradiation of the high molecular weight PTFE in the step (2) is much less likely to generate C6-C14 perfluorocarboxylic acids and salts thereof.

The oxygen content can be checked using oxygen detection paper, as well as analysis by gas chromatography.

The oxygen adsorbent may be any adsorbent capable of adsorbing oxygen. Examples thereof include known oxygen adsorbents, including inorganic oxygen adsorbents such as iron-based, zinc-based, or hydrosulfite-based adsorbents, and organic oxygen adsorbents such as ascorbic acid-based, polyhydric alcohol-based, or activated carbon-based adsorbents. The oxygen adsorbent may be of either a water-dependent type which requires water for a reaction with oxygen or self-reactive type which does not require water, and is preferably of a self-reactive type. The oxygen adsorbent is preferably an iron-based self-reactive oxygen adsorbent, quicklime, or the like, and is more preferably an iron-based self-reactive oxygen adsorbent.

The amount of the oxygen adsorbent to be fed is preferably such that the airtight container can have an oxygen concentration within the range indicated above.

The airtight container herein means a container which can be sealed up so as to adjust the oxygen concentration in the airtight container. Thus, the airtight container may be coupled with pipes for intake and exhaust of the inert gas and for exhausting gas inside the airtight container, and may be coupled with components such as pipes, caps, valves, and flanges which are closed during irradiation. The airtight container may have any shape, such as a cylindrical shape, a prismatic shape, or a spherical shape, or may be a bag with a variable capacity. The container may be formed of any material, such as metal, glass, or a polymer. The material and structure of the airtight container need to be radiolucent and not deteriorated by irradiation. The airtight container needs not to be a pressure-resistant container.

In the step (2), the high molecular weight PTFE can be irradiated by, for example, the following method under the following conditions. The step (2) is performed after the step (1).

In the step (2), the airtight container preferably contains substantially no oxygen. The phrase "contains substantially no oxygen" herein means that the oxygen concentration in the atmosphere inside the airtight container is 0.1 vol % or less.

The oxygen concentration can be determined by analyzing a gaseous layer inside the airtight container by gas chromatography or observing the color tone of an oxygen detection agent placed in the airtight container.

The condition where the airtight container contains substantially no oxygen can be achieved by adjusting the amount of at least one selected from the group consisting of the inert gases and the oxygen adsorbents to be fed into the airtight container as appropriate.

Examples of the radiation include any ionizing radiation, such as electron beams, gamma rays, X-rays, neutron beams, and high energy ions. Electron beams or gamma rays are preferred.

The radiation preferably has an exposure dose of 1 to 2500 kGy, more preferably 1000 kGy or lower, still more preferably 750 kGy or lower, while more preferably 10 kGy or higher, still more preferably 50 kGy or higher.

The irradiation temperature may be any temperature within the range of 5° C. to the melting point of high molecular weight PTFE. It is known that the molecular chain of high molecular weight PTFE is crosslinked around the melting point thereof. The irradiation temperature is therefore preferably 320° C. or lower, more preferably 300° C. or lower, still more preferably 260° C. or lower, in order to provide low molecular weight PTFE. From an economic viewpoint, the irradiation is preferably performed at room temperature.

The production method of the disclosure may further include (3) heating the high molecular weight PTFE up to a temperature that is not lower than the primary melting point thereof to provide a molded article before the step (1). In this case, the molded article obtained in the step (3) can be used as the high molecular weight PTFE in the step (1).

The primary melting point is preferably 300° C. or higher, more preferably 310° C. or higher, still more preferably 320° C. or higher.

The primary melting point means the maximum peak temperature on an endothermic curve present on the crystal melting curve when unsintered high molecular weight PTFE is analyzed with a differential scanning calorimeter. The endothermic curve is obtainable by increasing the temperature at a temperature-increasing rate of 10° C./min using a differential scanning calorimeter.

The molded article in the step (3) preferably has a specific gravity of 1.0 g/cm$^3$ or higher, more preferably 1.5 g/cm$^3$ or higher, while preferably 2.5 g/cm$^3$ or lower. When the specific gravity of the molded article is within the above range, pores or irregularities on the surface are reduced, resulting in production of low molecular weight PTFE having a small specific surface area.

The specific gravity can be determined by water displacement.

The production method of the disclosure may further include pulverizing the molded article to provide powder of the PTFE after the step (3). The molded article may be first coarsely and then finely pulverized.

The production method of the disclosure may further include pulverizing the low molecular weight PTFE to provide a low molecular weight PTFE powder after the step (2).

The pulverization may be performed by any method, such as pulverization using a pulverizer. Examples of the pulverizer include impact-type pulverizers such as hammer mills, pin mills, and jet mills, and grinding-type pulverizers utilizing shearing force generated by unevenness between a rotary blade and a peripheral stator, such as cutter mills.

The pulverization temperature is preferably not lower than −200° C. but lower than 50° C. In the case of freeze pulverization, the pulverization temperature is usually −200° C. to −100° C. Still, the pulverization may be performed around room temperature (10° C. to 30° C.). Freeze pulverization is usually achieved by the use of liquid nitrogen, but such pulverization requires enormous equipment and high pulverization cost. In order to simplify the step and reduce the pulverization cost, the pulverization temperature is more preferably not lower than 10° C. but lower than 50° C., still more preferably 10° C. to 40° C., particularly preferably 10° C. to 30° C.

The pulverization may be followed by removal of fine particles and fibrous particles by air classification, and further followed by removal of coarse particles by classification.

In the air classification, the pulverized particles are sent to a cylindrical classification chamber by decompressed air and dispersed by swirl flow inside the chamber, and fine particles are classified by centrifugal force. The fine particles are collected from the central portion into a cyclone and a bag filter. Inside the classification chamber is provided a rotary device such as a circular-cone-like cone or rotor configured to achieve homogeneous gyrating movement of the pulverized particles and the air.

In the case of using a classification cone, the classification point is adjusted by controlling the volume of the secondary air or the gap between the guide cone and the classification cone. In the case of using a rotor, the air volume inside the classification chamber is adjusted by the number of rotations of the rotor.

Examples of the method of removing coarse particles include air classification, vibration sieving, and ultrasonic sieving with meshes. Air classification is preferred.

Next, high molecular weight PTFE to be irradiated in the step (2) of the production method of the disclosure and low molecular weight PTFE to be obtained after the irradiation are described hereinbelow.

The low molecular weight PTFE has a melt viscosity at 380° C. of $1.0 \times 10^2$ to $7.0 \times 10^5$ Pa·s. The term "low molecular weight" herein means that the melt viscosity is within the above range. The melt viscosity is preferably $1.5 \times 10^3$ Pa·s or higher, while preferably $3.0 \times 10^5$ Pa·s or lower, more preferably $1.0 \times 10^5$ Pa·s or lower.

The melt viscosity is a value determined by heating a 2-g sample at 380° C. for five minutes in advance and then keeping this sample at this temperature under a load of 0.7 MPa using a flow tester (Shimadzu Corp.) and a 2ϕ-8L die in conformity with ASTM D1238.

The PTFE to be irradiated preferably has a standard specific gravity (SSG) of 2.130 to 2.230. The standard specific gravity (SSG) is a value determined in conformity with ASTM D4895.

The PTFE has a significantly higher melt viscosity than the low molecular weight PTFE, and thus the melt viscosity thereof is difficult to measure accurately. In contrast, the melt viscosity of the low molecular weight PTFE is measurable, but the low molecular weight PTFE has difficulty in providing a molded article usable for measurement of standard specific gravity. Thus, the standard specific gravity thereof is difficult to measure accurately. Therefore, in the disclosure, the standard specific gravity is used as an indicator of the molecular weight of the PTFE to be irradiated, while the melt viscosity is used as an indicator of the molecular weight of the low molecular weight PTFE. For both the PTFE and the low molecular weight PTFE, no method for determining the molecular weight directly has been known so far.

The low molecular weight PTFE has a melting point of 320° C. to 340° C., more preferably 324° C. to 336° C.

The melting point is defined using a differential scanning calorimeter (DSC) as follows. Specifically, temperature calibration is performed in advance with indium and lead as standard samples. Then, about 3 mg of low molecular weight PTFE is put into an aluminum pan (crimped container), and the temperature is increased at a rate of 10° C./min within the temperature range of 250° C. to 380° C. under air flow at 200 ml/min. The minimum point of the heat of fusion within this region is defined as the melting point.

In the production method of the disclosure, the PTFE may be in any form, such as powder, a molded article of the PTFE, or shavings generated by cutting the molded article of the PTFE. The PTFE in the form of powder can easily provide powder of the low molecular weight PTFE.

The low molecular weight PTFE obtainable by the production method of the disclosure may be in any form, and is preferably in the form of powder.

When the low molecular weight PTFE obtainable by the production method of the disclosure is in the form of powder, the specific surface area thereof is preferably 0.5 to 20 $m^2/g$.

For the low molecular weight PTFE powder, both of the following two types are demanded, i.e., a small specific surface area type having a specific surface area of not smaller than 0.5 $m^2/g$ but smaller than 7.0 $m^2/g$ and a large specific surface area type having a specific surface area of not smaller than 7.0 $m^2/g$ and not larger than 20 $m^2/g$.

The low molecular weight PTFE powder of a small specific surface area type has an advantage of easy dispersion in a matrix material such as coating. In contrast, such powder disperses in a matrix material with a large dispersed particle size, i.e., with poor fine dispersibility.

The low molecular weight PTFE powder of a small specific surface area type preferably has a specific surface area of 1.0 $m^2/g$ or larger, while preferably 5.0 $m^2/g$ or smaller, more preferably 3.0 $m^2/g$ or smaller. Suitable examples of the matrix material include plastics and inks, as well as coatings.

The low molecular weight PTFE powder of a large specific surface area type, when dispersed in a matrix material such as coating, has advantages of high surface-modifying effects, such as a small dispersed particle size in a matrix material and improved texture of the film surface, and a large amount of oil absorption. In contrast, such powder may not be easily dispersed in a matrix material (e.g., take a long time for dispersion), and may cause an increased viscosity of coating, for example.

The low molecular weight PTFE powder of a large specific surface area type preferably has a specific surface area of 8.0 $m^2/g$ or larger, while preferably 25 $m^2/g$ or smaller, more preferably 20 $m^2/g$ or smaller. Suitable examples of the matrix material include oils, greases, and coatings, as well as plastics.

The specific surface area is determined by the BET method using a surface analyzer (trade name: BELSORP-mini II, MicrotracBEL Corp.), a gas mixture of 30% nitrogen and 70% helium as carrier gas, and liquid nitrogen for cooling.

When the low molecular weight PTFE obtainable by the production method of the disclosure is in the form of powder, the average particle size thereof is preferably 0.5 to 200 μm, more preferably 50 μm or smaller, still more preferably 25 μm or smaller, particularly preferably 10 μm or smaller. As mentioned here, powder having a relatively small average particle size, when used as an additive for coating, for example, can provide a film having much better surface smoothness.

The average particle size is equivalent to the particle size corresponding to 50% of the cumulative volume in the particle size distribution determined using a laser diffraction particle size distribution analyzer (HELOS & RODOS) available from Jeol Ltd. at a dispersive pressure of 3.0 bar without cascade impaction.

The production method of the disclosure can provide low molecular weight PTFE substantially free from C6-C14 perfluorocarboxylic acids and salts thereof after the step (2). The low molecular weight PTFE obtainable by the production method of the disclosure preferably contains C6-C14 perfluorocarboxylic acids and salts thereof in a total amount by mass of not more than 50 ppb, more preferably less than 25 ppb, still more preferably not more than 15 ppb, still further preferably not more than 10 ppb, particularly preferably not more than 5 ppb, most preferably less than 5 ppb. The lower limit of the amount may be any value, and may be lower than the detection limit.

The amount of the perfluorocarboxylic acids and salts thereof can be determined by liquid chromatography.

The low molecular weight PTFE obtainable by the production method of the disclosure is also characterized in that it is substantially free from perfluorooctanoic acid and salts thereof. The low molecular weight PTFE obtainable by the production method of the disclosure preferably contains perfluorooctanoic acid and salts thereof in a total amount by mass of less than 25 ppb, more preferably not more than 15 ppb, still more preferably not more than 10 ppb, still further preferably not more than 5 ppb, particularly preferably less than 5 ppb. The lower limit may be any value, and may be lower than the detection limit.

The amount of perfluorooctanoic acid and salts thereof can be determined by liquid chromatography.

The low molecular weight PTFE obtainable by the production method of the disclosure is also characterized in that it is substantially free from C6-C14 perfluorosulfonic acids and salts thereof. The low molecular weight PTFE obtainable by the production method of the disclosure preferably contains C6-C14 perfluorosulfonic acids and salts thereof in a total amount by mass of less than 25 ppb, more preferably not more than 15 ppb, still more preferably not more than 10 ppb, still further preferably not more than 5 ppb, particularly preferably less than 5 ppb. The lower limit thereof may be any value, and may be lower than the detection limit.

The amount of the perfluorosulfonic acids and salts thereof can be determined by liquid chromatography.

The low molecular weight PTFE preferably contains 5 or less carboxyl groups at ends of the molecular chain per $10^6$ carbon atoms in the main chain. The number of carboxyl groups is more preferably 4 or less, still more preferably 3 or less, per $10^6$ carbon atoms in the main chain. The lower limit thereof may be any value, and may be lower than the detection limit. The carboxyl groups are generated at ends of the molecular chain of the low molecular weight PTFE, for example, by irradiation of the PTFE in the presence of oxygen.

The number of carboxyl groups is a value determined by the following method. The detection limit of this measurement method is 0.5.

(Measurement Method)

The following measurement is performed in conformity with the method of analyzing end groups disclosed in JP H04-20507 A.

Low molecular weight PTFE powder is preformed with a hand press to provide a film having a thickness of about 0.1 mm. The resulting film is subjected to infrared absorption spectrum analysis. PTFE with completely fluorinated ends by contact with fluorine gas is also subjected to infrared absorption spectrum analysis. Based on the difference spectrum therebetween, the number of carboxyl end groups is calculated by the following formula.

Number of carboxyl end groups (per $10^6$ carbon atoms)=$(l \times K)/t$ l: absorbance
K: correction coefficient
t: film thickness (mm)

The absorption frequency and correction coefficient of the carboxyl group are respectively set to 3560 cm$^{-1}$ and 440.

The low molecular weight PTFE may contain, at ends of the molecular chain, unstable end groups derived from the chemical structure of a polymerization initiator or chain-transfer agent used in the polymerization reaction of PTFE. Examples of the unstable end groups include, but are not limited to, —CH$_2$OH, —COOH, and —COOCH$_3$.

The low molecular weight PTFE may undergo, stabilization of the unstable end groups. The unstable end groups may be stabilized by any method, such as a method of exposing the unstable end groups to fluorine-containing gas to convert them into trifluoromethyl groups (—CF$_3$), for example.

The low molecular weight PTFE may contain amidated ends. The end amidation may be performed by any method, such as a method of bringing fluorocarbonyl groups (—COF) obtained by exposure to fluorine-containing gas into contact with ammonia gas as disclosed in JP H04-20507 A, for example.

The low molecular weight PTFE with stabilization or end amidation of the unstable end groups as described above can be well compatible with opposite materials and have improved dispersibility when used as an additive for opposite materials such as coatings, greases, cosmetics, plating solutions, toners, and plastics.

The PTFE may be a homo-PTFE consisting only of a tetrafluoroethylene (TFE) unit or may be a modified PTFE containing a TFE unit and a modifying monomer unit based on a modifying monomer copolymerizable with TFE. In the production method of the disclosure, the composition of the polymer is not changed. Thus, the low molecular weight PTFE has the composition of the PTFE as it is.

In the modified PTFE, the proportion of the modifying monomer unit is preferably 0.001 to 1% by mass, more preferably 0.01% by mass or more, while more preferably 0.5% by mass or less, still more preferably 0.1% by mass or less, of all the monomer units. The term "modifying monomer unit" herein means a moiety that is part of the molecular structure of the modified PTFE and is derived from a modifying monomer. The term "all the monomer units" herein means all the moieties derived from monomers in the molecular structure of the modified PTFE. The proportion of the modifying monomer unit can be determined by any known method such as Fourier transform infrared spectroscopy (FT-IR).

The modifying monomer may be any one copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ether; perfluoroalkylethylenes; and ethylene. One modifying monomer may be used, or multiple modifying monomers may be used.

Examples of the perfluorovinyl ether include, but are not limited to, unsaturated perfluoro compounds represented by the following formula (1):

wherein Rf is a perfluoroorganic group. The "perfluoroorganic group" herein means an organic group in which all the hydrogen atoms bonded to any carbon atom are replaced by fluorine atoms. The perfluoroorganic group may contain ether oxygen.

Examples of the perfluorovinyl ether include perfluoro (alkyl vinyl ethers) (PAVEs) represented by the formula (1) in which Rf is a C1-C10 perfluoroalkyl group. The perfluoroalkyl group preferably contains 1 to 5 carbon atoms.

Examples of the perfluoroalkyl group in the PAVE include perfluoromethyl, perfluoroethyl, perfluoropropyl, perfluorobutyl, perfluoropentyl, and perfluorohexyl groups. Preferred is perfluoro (propyl vinyl ether) (PPVE) in which the perfluoroalkyl group is a perfluoropropyl group.

Examples of the perfluorovinyl ether also include those represented by the formula (1) in which Rf is a C4-C9 perfluoro (alkoxyalkyl) group, those represented by the formula (1) in which Rf is a group represented by the following formula:

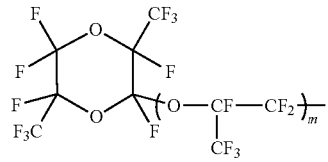

[Chem. 1]

(wherein m is 0 or an integer of 1 to 4), and those represented by the formula (1) in which Rf is a group represented by the following formula:

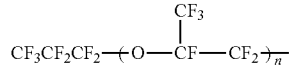

[Chem. 2]

wherein n is an integer of 1 to 4.

Examples of the perfluoroalkylethylenes include, but are not limited to, (perfluorobutyl)ethylene (PFBE), (perfluorohexyl)ethylene, and (perfluorooctyl)ethylene.

The modifying monomer in the modified PTFE is preferably at least one selected from the group consisting of HFP, CTFE, VDF, PPVE, PFBE, and ethylene. It is more preferably at least one selected from the group consisting of HFP and CTFE.

The low molecular weight PTFE obtainable by the production method of the disclosure can suitably be used as molding materials, inks, cosmetics, coatings, greases, components for office automation devices, additives for modifying toners, organic photoconductor materials for copiers, and additives for plating solutions, for example. Examples of the molding materials include engineering plastics such as polyoxybenzoyl polyester, polyimide, polyamide, polyamide-imide, polyacetal, polycarbonate, and polyphenylene sulfide. The low molecular weight PTFE is particularly suitable as a thickening agent for greases.

The low molecular weight PTFE can suitably be used as additives for molding materials for improving the non-adhesiveness and slidability of rollers of copiers, for improving the texture of molded articles of engineering plastics, such as surface sheets of furniture, dashboards of automobiles, and covers of home appliances, and for improving the smoothness and abrasion resistance of machine elements generating mechanical friction, such as light-load bearings, gears, cams, buttons of push-button telephones, movie projectors, camera components, and sliding materials, and processing aids for engineering plastics, for example.

The low molecular weight PTFE can be used as additives for coatings for the purpose of improving the smoothness of varnish and paint. The low molecular weight PTFE can be used as additives for cosmetics for the purpose of improving the smoothness of cosmetics such as foundation.

The low molecular weight PTFE can also be suitably used for improving the oil or water repellency of wax and for improving the smoothness of greases and toners.

The low molecular weight PTFE can be used as electrode binders of secondary batteries and fuel cells, hardness adjusters for electrode binders, and water repellents for electrode surfaces.

The low molecular weight PTFE may be combined with a lubricant to provide grease. The grease is characterized by containing the low molecular weight PTFE and a lubricant. Thus, the low molecular weight PTFE is uniformly and stably dispersed in the lubricant and the grease exhibits excellent performance such as load resistance, electric insulation, and low moisture absorption.

The lubricant (base oil) may be either mineral oil or synthetic oil. Examples of the lubricant (base oil) include paraffinic or naphthenic mineral oils, and synthetic oils such as synthetic hydrocarbon oils, ester oils, fluorine oils, and silicone oils. In terms of heat resistance, fluorine oils are preferred. Examples of the fluorine oils include perfluoropolyether oil and polychlorotrifluoroethylene with a low polymerization degree. The polychlorotrifluoroethylene with a low polymerization degree may have a weight average molecular weight of 500 to 1200.

The grease may further contain a thickening agent. Examples of the thickening agent include metal soaps, composite metal soaps, bentonite, phthalocyanin, silica gel, urea compounds, urea/urethane compounds, urethane compounds, and imide compounds. Examples of the metal soaps include sodium soap, calcium soap, aluminum soap, and lithium soap. Examples of the urea compounds, urea/urethane compounds, and urethane compounds include diurea compounds, triurea compounds, tetraurea compounds, other polyurea compounds, urea/urethane compounds, diurethane compounds, and mixtures thereof.

The grease preferably contains the low molecular weight PTFE in an amount of 0.1 to 60% by mass, more preferably 0.5% by mass or more, still more preferably 5% by mass or more, while more preferably 50% by mass or less. A grease containing too large an amount of the low molecular weight PTFE may be too hard to provide sufficient lubrication. A grease containing too small an amount of the low molecular weight PTFE may fail to exert the sealability.

The grease may also contain any of additives such as solid lubricants, extreme pressure agents, antioxidants, oilness agents, anticorrosives, viscosity index improvers, and detergent dispersants.

EXAMPLES

The disclosure is more specifically described below with reference to examples. Still, the disclosure is not intended to be limited to the following examples.

The parameters in the examples were determined by the following methods.

Melt Viscosity

The melt viscosity was determined by heating a 2-g sample at 380° C. for five minutes in advance and then keeping this sample at this temperature under a load of 0.7 MPa using a flow tester (Shimadzu Corp.) and a 2ϕ-8L die in conformity with ASTM D1238.

Amount of Perfluorooctanoic Acid and Salts Thereof (PFOA)

The amount of perfluorooctanoic acid and salts thereof was determined using a liquid chromatography-mass spectrometer (LC-MS ACQUITY UPLC/TQD, Waters). Measurement powder (1 g) was mixed with acetonitrile (5 ml) and the mixture was sonicated for 60 minutes, so that perfluorooctanoic acid was extracted. The resulting liquid phase was analyzed by multiple reaction monitoring (MRM). Acetonitrile (A) and an aqueous ammonium acetate solution (20 mmol/L) (B) were passed at a predetermined concentration gradient (A/B=40/60 for 2 min and 80/20 for 1 min) as mobile phases. A separation column (ACQUITY UPLC BEH C18 1.7 µm) was used at a column temperature of 40° C. and an injection volume of 5 µL. Electrospray ionization (ESI) in a negative mode was used as the ionization method, and the cone voltage was set to 25 V. The ratio of the molecular weight of precursor ions to the molecular weight of product ions was measured to be 413/369. The amount of perfluorooctanoic acid and salts thereof was calculated by the external standard method. The detection limit of this measurement is 5 ppb.

Amount of C6-C14 Perfluorocarboxylic Acids and Salts Thereof (PFC)

C6-C14 perfluorocarboxylic acids and salts thereof were detected using a liquid chromatography-mass spectrometer (LC-MS ACQUITY UPLC/TQD, Waters). The solution used was the liquid phase extracted in the measurement of perfluorooctanoic acid, and the measurement was performed by MRM. The measurement conditions were based on the measurement conditions for perfluorooctanoic acid, but the concentration gradient was changed (A/B=10/90 for 1.5 min and 90/10 for 3.5 min). The ratio of the molecular weight of precursor ions to the molecular weight of product ions was measured to be 313/269 for perfluorohexanoic acid (C6), 363/319 for perfluoroheptanoic acid (C7), 413/369 for perfluorooctanoic acid (C8), 463/419 for perfluorononanoic acid (C9), 513/469 for perfluorodecanoic acid (C10), 563/519 for perfluoroundecanoic acid (C11), 613/569 for perfluorododecanoic acid (C12), 663/619 for perfluorotridecanoic acid (C13), and 713/669 for perfluorotetradecanoic acid (C14).

The total amount of C6-C14 perfluorocarboxylic acids and salts thereof was calculated from the amount (X) of the perfluorooctanoic acid obtained in the above measurement by the following formula. The detection limit of this measurement is 5 ppb.

$$(A_{c6}+A_{c7}+A_{c8}+A_{c9}+A_{c10}+A_{c11}+A_{c12}+A_{c13}+A_{c14})/A_{c8} \times X$$

$A_{c6}$: peak area of perfluorohexanoic acid
$A_{c7}$: peak area of perfluoroheptanoic acid
$A_{c8}$: peak area of perfluorooctanoic acid
$A_{c9}$: peak area of perfluorononanoic acid
$A_{c10}$: peak area of perfluorodecanoic acid
$A_{c11}$: peak area of perfluoroundecanoic acid
$A_{c12}$: peak area of perfluorododecanoic acid
$A_{c13}$: peak area of perfluorotridecanoic acid
$A_{c14}$: peak area of perfluorotetradecanoic acid
X: amount of perfluorooctanoic acid calculated from the MRM measurement result by the external standard method Oxygen Concentration in Airtight Container The oxygen concentration was determined by analyzing a gaseous layer inside the airtight container by gas chromatography. Moreover, the color tone of oxygen detection paper enclosed in the airtight container was observed to change from blue to pink, which demonstrated that the oxygen concentration was 0.1 vol % or less (oxygen was absent).

Example 1

A barrier nylon bag was charged with 47.5 g of PTFE fine powder (standard specific gravity determined in conformity with ASTM D 4895: 2.175, concentrations of PFC and PFOA were lower than the detection limits), with 2.5 g of PCTFE (M-400H, PCTFE produced by Daikin Industries, Ltd.) added as a halogenated polymer. The inside of the bag was purged with nitrogen gas 10 times so that the atmosphere in the bag was made to be a nitrogen atmosphere. The bag was then heat-sealed. The oxygen concentration in the sealed bag after the purging was 50 ppm.

The absence of oxygen was confirmed with the oxygen detection paper placed in the bag in advance, and then the PTFE fine powder in the bag was irradiated with 200 kGy of cobalt-60 γ rays at room temperature. Thereby, a low molecular weight PTFE powder was obtained.

The physical properties of the resulting low molecular weight PTFE powder were determined. The results are shown in Table 1.

Example 2

A low molecular weight PTFE powder was obtained in the same manner as in Example 1 except that the amounts of PTFE fine powder and PCTFE were respectively changed to 45 g and 5 g.

The physical properties of the resulting low molecular weight PTFE powder were determined in the same manner as in Example 1. The results are shown in Table 1.

Comparative Example 1

A low molecular weight PTFE powder was obtained in the same manner as in Example 1 except that the amount of PTFE fine powder used was 50 g and PCTFE was not added.

The physical properties of the resulting low molecular weight PTFE powder were determined in the same manner as in Example 1. The results are shown in Table 1.

TABLE 1

|  | Example 1 | Example 2 | Comparative Example 1 |
| --- | --- | --- | --- |
| Halogenated polymer | PCTFE | PCTFE | — |
| Mass ratio of PTFE/halogenated polymer | 95/5 | 90/10 | 100/0 |
| Deoxidation method | Nitrogen purge | Nitrogen purge | Nitrogen purge |
| PFC content (ppb) | <5 | 10 | <5 |
| PFOA content (ppb) | <5 | 7 | <5 |
| Melt viscosity at 380° C. (Pa · s) | $7.5 \times 10^4$ | $6.6 \times 10^4$ | Not lower than detection limit |

The phrase "not lower than detection limit" for the melt viscosity means that the molecular weight was too small to be expressed in terms of the melt viscosity.

The invention claimed is:

1. A method for producing low molecular weight polytetrafluoroethylene, comprising:

(1) feeding into an airtight container in the absence of oxygen:

high molecular weight polytetrafluoroethylene having a standard specific gravity of 2.130 to 2.230: and a halogenated polymer having a halogen atom other than a fluorine atom; and (2) irradiating the high molecular weight polytetrafluoroethylene at a temperature of 320° C. or lower to provide low molecular weight polytetrafluoroethylene having a melt viscosity at 380° C. of $1.0 \times 10^2$ to $7.0 \times 10^5$ Pa·s.

2. The production method according to claim 1, wherein the halogenated polymer is a polymer having a chlorine atom.

3. The production method according to claim 1, wherein in the step (2), the airtight container contains substantially no oxygen.

4. The production method according to claim 1, wherein both the high molecular weight polytetrafluoroethylene and the low molecular weight polytetrafluoroethylene are in the form of powder.

5. The production method according to claim 1, further comprising (3) heating the polytetrafluoroethylene up to a temperature that is not lower than the primary melting point thereof to provide a molded article before the step (1), the molded article having a specific gravity of 1.0 g/cm³ or higher.

* * * * *